United States Patent Office 2,959,666
Patented Nov. 8, 1960

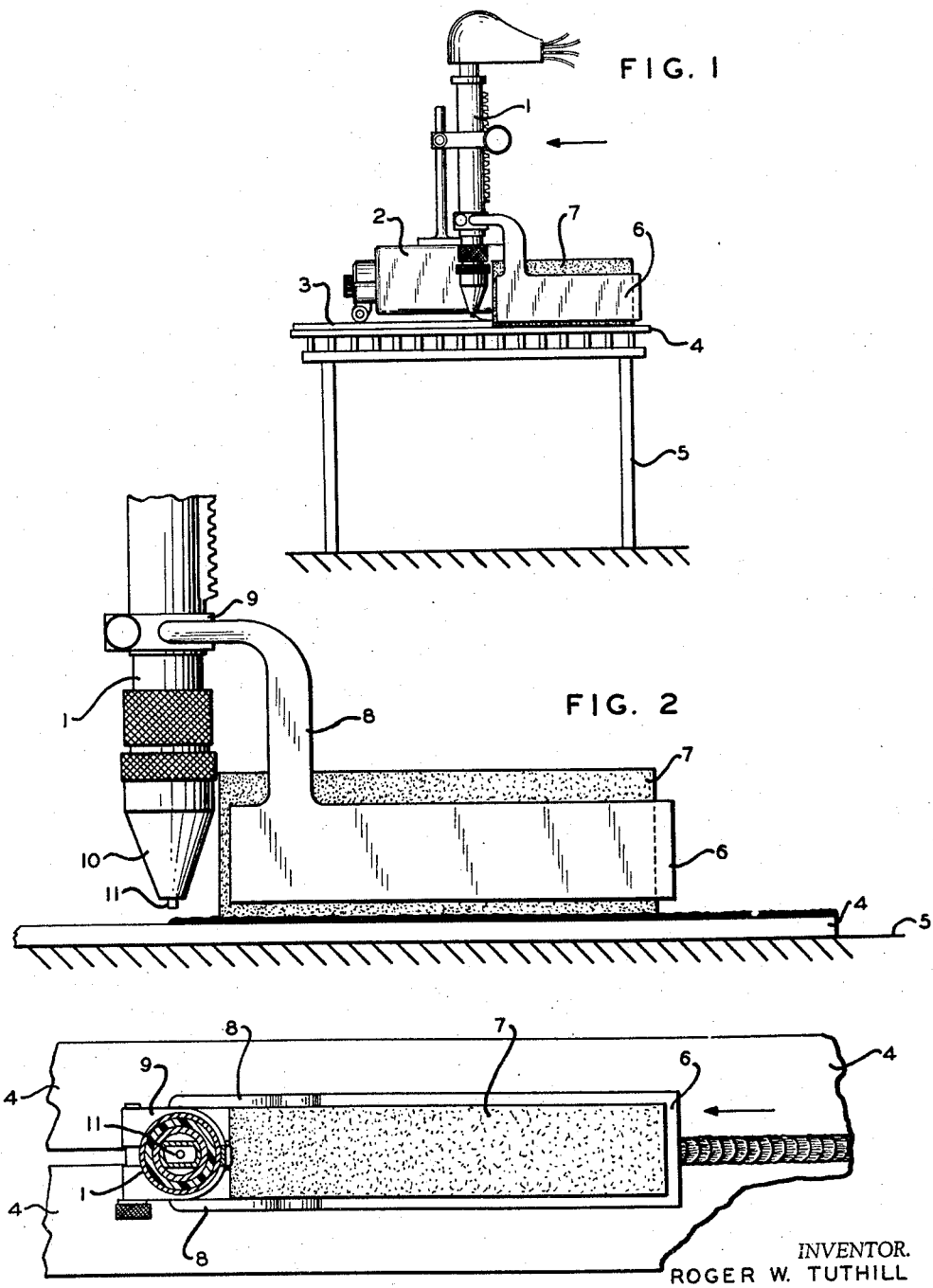

2,959,666
ARC WELDING
Roger W. Tuthill, Elizabeth, N.J., assignor to Air Reduction Company, Incorporated, New York, N.Y., a corporation of New York
Filed May 29, 1958, Ser. No. 738,858
4 Claims. (Cl. 219—74)

My invention relates to methods and apparatus for arc welding metals in shielding gases whereby the weld, after it has been formed by fusion and solidification of the weld metal, is protected from oxidation by the surrounding air and simultaneously receives a heat treatment which in some instances improves its metallurgical structure. However, my invention has broader aspects in that it is not necessarily limited to arc welding but may be used primarily for heat treating metals to secure desired metallurgical effects therein.

My invention is particularly applicable to inert gas arc welding wherein an arc is established between an electrode and a workpart and a shielding gas comprising essentially inert monatomic gas is applied about the arc, the arcing terminal of the electrode, and the heated workpart at the arc. The inert shielding gas may be argon, helium or a mixture of these gases and, for securing certain desirable operating conditions, minor additions of other gases may be added to the inert gas or gas mixture without impairing the essentially inert characteristics thereof.

The welding electrode may be consumable in the arc and selected in accordance with the metal being welded or it may be of tungsten or an equivalent material which in the inert atmosphere is virtually non-consuming. In either instance filler metal may be added to the weld to increase the size of the joint formed between the parts being welded. The inert gas arc welding process may also be used to form overlays of hard or chemically resistant metal on parts which are thus protected from their environment.

When using a consumable electrode operating at high current densities, the inert arc welding procedure is productive of other desirable results such as the self-regulating characteristics of the arc which makes it possible to feed the welding electrode at a constant rate of speed and such as a spray-type metal transfer in the arc which is very advantageous especially when performing vertical and overhead welding. Furthermore in view of the higher current densities thus employed, excellent weld penetration is obtained. This particular method of inert arc welding is described and claimed in United States Letters Patent 2,504,868, Albert Muller, Glenn J. Gibson, and Nelson E. Anderson, granted April 18, 1950, for Electric Arc Welding.

The inert gas method of arc welding has proved very successful for joining all metals and is the only method of welding certain metals which must be protected from the surrounding atmosphere in order to secure non-porous welds of desired metallurgical characteristics. The shielding gas eliminates the need to use solid or liquid fluxes and also eliminates the danger of flux inclusions in the weld and the difficulty of cleaning the weld when such fluxes are used in making it. The inert gas also has a cleaning action which is beneficial when welding metals forming refractory oxides such as aluminum, magnesium, their alloys, stainless steel and like metals and alloys. Satisfactory welding of certain metals such as titanium, zirconium and alloys of these metals can be accomplished only by using this process. The gas shield prevents contamination of the weld by the oxygen and nitrogen of the air or by hydrogen which may be present by reason of the dissociation of water or water vapor in the arc region. The inert arc process has sometimes been adopted because it conserves expensive alloying constituents in the metal such as may be used in certain stainless steels.

It has heretofore been proposed to form the weld between workparts by enclosing the arc, the arcing tip of the electrode, and the portion of the workpart rendered molten by the arc in a stream of inert gas which forms a primary shield to protect the weld during its formation and to provide a trailing or secondary stream of gas behind a welding arc with reference to its direction of travel over the work which forms a secondary shield to protect the weld after the molten metal thereof has solidified but is still at an elevated temperature and subject to oxidation by the surrounding air. This double shielding of the weld adds greatly to the expense of the welding operation since the cost of the inert gas is a considerable part of the total cost of making the weld. Furthermore, the nozzle for the trailing stream is subjected to the heat of the welding operation and must be water cooled and have association therewith not only means to control the flow of cooling water but also to control the flow of shielding gas all of which complicates the structure of the welding head and adds to its cost.

In accordance with my invention the secondary or post-weld gas shield in inert arc welding is provided by trailing a quantity of solid carbon dioxide along the surface of the weld zone immediately behind the welding arc where the advancing weld pool has solidified but has not yet passed beyond the area protected by the shielding effect of the envelope of primary gas provided by the stream of inert gas supplied about the arc and the molten weld metal at the arc. The solid carbon dioxide is positioned in trailing relation to the welding arc by a low cost holder of simplified construction which permits the carbon dioxide to contact the work or be placed closely adjacent thereto.

At atmospheric pressure solid carbon dioxide sublimes at a temperature of about −110° F. and when located adjacent to or in contact with the hot workpart produces a quenching effect on the weld which for some metals and alloys improves their metallurgical characteristics. Thus, for example, when welding non-stabilized 18-8 stainless steel, the rapid cooling of the weld will prevent intergranular carbide precipitation and thus increase the corrosion resistance of the weld area. As will be apparent to those skilled in the art, like beneficial results may be obtained when welding other metals and alloys in accordance with my procedure. In any case the weld metal will be quickly cooled to temperatures below which it will not be oxidized by the surrounding air.

At 70° F. and one atmosphere one pound of solid carbon dioxide will vaporize to yield 8.7 cubic feet of gaseous carbon dioxide having a specific gravity relative to air of about 1.53. Consequently the cold carbon dioxide gas derived from the solid carbon dioxide will fall to the workpart to form a shielding blanket over the solidified hot weld metal and will merge with the primary shield of inert gas at the point of welding to protect the weld metal so long as it is subject to oxidation while at an elevated temperature. Carbon dioxide gas at the temperature of solidified weld metal will not dissociate to release oxygen and cannot react with the solid weld metal to liberate oxygen. At the melting point of iron, carbon dioxide gas will dissociate to a slight extent, but at temperatures below about 1340° F. calculations based on conditions of equilibrium indicate no dissociation of the carbon dioxide gas. Actual practice has demonstrated that shielding with gaseous carbon dioxide obtained by the sublimation of solid carbon dioxide will prevent oxidation of the weld and produce clean, bright surfaces.

My invention will be better understood by considering a particular embodiment of apparatus which I have used in practicing my method of welding and of metal treatment. This embodiment has been illustrated in the accompanying drawing where:

Fig. 1 shows means for traversing relative to a workpart, an inert arc welding head which has been equipped with a holder for trailing along the workpart a quantity of solid carbon dioxide which is located immediately behind the welding arc and lengthwise of its path of travel over the workpart;

Fig. 2 is a side view showing in greater detail the construction of the solid carbon dioxide holder and its attachment to the welding head; and Fig. 3 is a plan view of the showing in Fig. 2.

In the drawing an inert arc welding head or torch 1 is shown as being mounted on a travel carriage 2 for movement along a track 3 placed on a workpart 4 which is supported on a table 5. As indicated by the arrow, the travel carriage embodies means by which it is propelled to the left as viewed in Fig. 1 and a holder or box 6 is mounted on the torch in trailing relation thereto in its travel over the workpart. A cake 7 of solid carbon dioxide is positioned in holder 6 which is constructed and arranged to freely hold it in contact with the workpart immediately behind the arc in its travel over the workpart. As better shown in Figs. 2 and 3, the holder 6 has its top, bottom and front end open and has retaining walls at its sides and back end which hold and position the cake of solid carbon dioxide in contact with the workpart in trailing relation to the arc of torch 1 in its movement over the workpart. The holder is provided with arms 8 which terminate in a detachable circular clamp 9 by which it is secured to the welding torch. The open front end of holder 6 is located closely adjacent to the torch nozzle 10 through which a stream of inert gas is supplied about the arcing terminal of its electrode 11, the arc established therebetween and the workpart, and the heated portion of the workpart at the arc.

The gaseous carbon dioxide supplied by sublimation of the cake of solid carbon dioxide covers the portion of the workpart which has been heated by the welding arc and is about to pass beyond the shielding effect of the inert gas stream supplied through the nozzle of the welding torch. The open end of the holder which is adjacent to the torch nozzle permits the gaseous carbon dioxide to spill forward and make an effective junction with the shielding gas supplied through the torch nozzle and thus protect the weld after it has solidified but is still at elevated temperature rendering it prone to rapid surface oxidation by the surrounding air.

The holder extends lengthwise of the path of travel of the welding arc over the workpart and is preferably made of sufficient length to provide adequate shielding of the weld until it has cooled to room temperature or thereabout and is no longer subject to rapid oxidation as it would be at the elevated temperatures at which it leaves the shielding effect of the gas stream supplied through the nozzle of the welding torch.

In the arrangement shown in the drawing, torch 1 embodies the structural details shown in United States Letters Patent 2,512,705, Nelson E. Anderson and George R. Turbett, granted June 27, 1950, for Fluid-Cooled Gas-Blanketed Arc Welding Torch. This torch embodies a non-consumable electrode of tungsten or of like material. It is apparent that other types of welding torches embodying non-consumable electrodes may be substituted for the particular torch shown in the drawing. Furthermore it is apparent that a torch for supplying consumable electrodes to the arc may be used such, for example, as the torch shown in the above referred to United States Letters Patent 2,504,868.

The particular construction of the solid carbon dioxide holder of my invention will depend on conditions encountered in its use with inert arc torches of varying types. If a high energy torch is employed for increasing the welding speed or the melting rate of a consumable electrode, the length of the holder as well as its width may have to be increased to provide adequate shielding until the hot metal parts trailing behind the arc have cooled to a temperature at which no oxidation thereof would occur when exposed to the surrounding air. Furthermore it is apparent that the holder could have other constructions which would adapt it to retain solid carbon dioxide in forms other than the cake form shown in the drawing. For example, it could be in the form of a basket with a perforated bottom closure so that the solid carbon dioxide would be positioned close to but spaced from the work and not in engagement thereto as shown in the drawing. With such a construction the shielding gaseous carbon dioxide formed by sublimation of the solid carbon dioxide would pass through the bottom of the basket and fall to the workpart to cool it and shield it from the surrounding air. In furtherance of the same contemplated usage, the bottom of the holder could be closed by a porous metal part through which the gaseous carbon dioxide would pass at a less rapid rate than through a bottom member provided with holes or its equivalent, a wire mesh screen. In fact the holder may constitute a hopper with an opening at its bottom which is spaced from the workpart for applying a layer of granulated solid carbon dioxide to the workpart in back of the arc as the arc moves over the workpart. With such an arrangement the quantity of solid carbon dioxide in the layer thereof applied to the workpart would then be only that necessary to obtain a desired rapid cooling of the hot weld metal for heat treatment in some instances and for shielding it while it is at an elevated temperature which would result in oxidation of its surface if exposed to the surrounding air.

Obviously the holder for the solid carbon dioxide need not be supported on the welding torch or head as shown in the drawing since it can be traversed over the workpart in trailing relation thereto by other means such as by being independently mounted on the travel carriage on which the welding head is mounted. Other modifications of the holder and its mounting will occur to those skilled in the art to which my invention relates.

Thus, in accordance with my invention, after a weld has solidified and before it passes beyond the arc and the shielding gas stream of the torch by means of which it was made, means are provided for supplying to the weld and to the workparts joined by the weld a quantity of solid carbon dioxide which is located immediately behind the arc and its shielding gas stream and extends lengthwise of their paths of travel over the workpart by an amount sufficient to quench the weld and protect it from oxidation by the surrounding air by the blanket of gaseous carbon dioxide which is provided by sublimation of the solid carbon dioxide. Of course, as pointed out above, my invention is not limited to its application to welding but may be used for metal treatment to secure desired metallurgical characteristics in the metal by traversing a heating agency along a path of travel over a metal workpart to apply heat thereto and thereafter traversing over the heated workpart in trailing relation to the heating agency a quantity of solid carbon dioxide which is located behind the heating agency and lengthwise of its path of travel over the workpart and which covers that portion of the workpart to which heat has been applied by said heating agency. The temperature of the metal prior to quenching by applying the solid carbon dioxide thereto may be variously obtained as by varying the heat output of the heating agency or its rate of travel or by variously spacing the holder for the solid carbon dioxide from the heating agency. The rate of cooling may be varied by providing for direct contact of the solid carbon dioxide with the workpart or by using a basket like holder which spaces it from the workpart. Various arrangement may be used to secure these adjustments.

In view of the above description of my invention it will be apparent to those skilled in the art to which it relates that it is not limited in any way to the mere details or relative arrangement of parts shown in the accompanying drawing and that deviations may be made therefrom without departing from the spirit and scope of my invention.

What I claim is:

1. In a process for electric arc welding in which the arc and the weld pool are shielded from the surrounding air by an envelope of gas comprising essentially inert monatomic gas, the improvement which comprises supplying carbon dioxide at a temperature of about −110° F. to the solidified weld metal immediately back of the area protected by said inert gas shield to rapidly remove heat from the weld zone while excluding the surrounding air therefrom.

2. A process according to claim 1 in which the carbon dioxide is applied to the solidified weld metal by trailing a body of solid carbon dioxide along the weld immediately back of the advancing weld pool.

3. The method of arc welding which comprises maintaining an arc between the tip of an electrode and juxtaposed workparts to be welded together, surrounding said tip of said electrode, said arc, and the heated portions of said workparts at said arc with a stream of gas comprising essentially inert monatomic gas, moving said arc and its shielding gas stream along a path of travel over said workparts to fuse together juxtaposed parts thereof which solidify to form a weld between them as the arc passes along said workparts, and, after said weld has solidified, removing heat from the zone of solidified weld metal while excluding the ambient air therefrom by the vaporization of carbon dioxide applied to the weld zone immediately back of the inert gas shield.

4. Apparatus comprising a gas-arc torch which in use is traversed over a workpart to apply heat thereto, said torch having therein means for supporting an electrode in arcing engagement with said workpart and means for supplying an inert gas shield about the arcing terminal of said electrode, the arc established between said electrode and said workpart and the heated portion of said workpart at said arc; and means for supplying carbon dioxide at a temperature of about −110° F. to rapidly cool and shield from the surrounding air the heated portion of said workpart as it passes beyond the inert gas shield provided by said torch in its travel over said workpart, said means including a holder for positioning a quantity of solid carbon dioxide over said workpart immediately behind said torch and trailing it in its travel over said workpart.

References Cited in the file of this patent

UNITED STATES PATENTS

| | | |
|---|---|---|
| 2,497,629 | Rieppel | Feb. 14, 1950 |
| 2,644,070 | Herbst | June 30, 1953 |
| 2,804,885 | Matt | Sept. 3, 1957 |
| 2,882,385 | Lyons | Apr. 14, 1959 |